United States Patent [19]

Gueant et al.

[11] 4,018,805

[45] Apr. 19, 1977

[54] METHOD FOR PREPARING FATTY ACIDS FROM THEIR CORRESPONDING SOAPS

[75] Inventors: Auguste Gueant, Lens; Serge Mercier, Paris, both of France

[73] Assignee: Produits Chimiques Ugine Kuhlmann, Paris, France

[22] Filed: Sept. 20, 1974

[21] Appl. No.: 507,949

[30] Foreign Application Priority Data

Sept. 26, 1973 France .............................. 73.34464

[52] U.S. Cl. ........................... 260/413; 260/526 R; 260/540
[51] Int. Cl.² ........................................ C07C 51/02
[58] Field of Search ............... 260/413, 540, 531 C, 260/526 R

[56] References Cited

UNITED STATES PATENTS

| 3,370,074 | 2/1968 | Dimond et al. .................... 260/413 |
| 3,560,537 | 2/1971 | Eller .................................. 260/413 |

Primary Examiner—Winston A. Douglas
Assistant Examiner—P. E. Konopka
Attorney, Agent, or Firm—Pennie & Edmonds

[57] ABSTRACT

Fatty acids are made from corresponding carboxylate soaps by a method which comprises dissolving the soaps in at least one fatty acid in a melted state in the absence of oxygen, contacting the liquid solution of soap in fatty acid with an aqueous solution containing an amount of strong mineral acid at least stoichiometrically equivalent to the soap and allowing the cations of soap and strong acid to exchange phases, the amount of water being just sufficient to dissolve substantially all of the mineral salt thus formed.

7 Claims, No Drawings

METHOD FOR PREPARING FATTY ACIDS FROM THEIR CORRESPONDING SOAPS

BACKGROUND OF THE INVENTION

The present invention provides a method for producing fatty acids from their corresponding alkali metal or alkaline earth metal "salts" or soaps.

When it is attempted to prepare a $C_4$–$C_{30}$ alkyl carboxylic acid from exemplarily its sodium soap by simple acidification in aqueous medium with a strong acid, several kinds of difficulties are encountered. In order to have both soap and the strong acid in solution, extreme dilutions with impractical amounts of water must be used. Furthermore, phase separation of the fatty acid is not clear-cut and is often fraught with undesirable emulsification.

In particular, these technical problems complicate the exploitation of the well-known OXO process as a means toward producing fatty acids. The literature has described the preparation of soaps by first hydroformylating olefins, followed by alkaline fusion of the resultant oxygenated products, such as alcohols, aldehydes, esters, ethers and high-boiling polymerized substances. The preparation of corresponding fatty acids from these soaps is disclosed, for example in French Pat. Nos. 1,277,098 and 2,080,398.

The disclosed procedures for the acidification of soaps have numerous disadvantages, particularly as a result of the poor solubility of the solid soaps in water, generally of the order of only about 10 to 15%, which requires the use of large volumes of water, about 7 to 10 liters of water per kilogram of soap, which in turn requires correspondingly voluminous equipment and presents a problem in discharging the spent water.

In order to make the soap dissolve more rapidly in water, it is furthermore necessary to submit the solid soap to a preliminary comminution into powder or flakes. Another disadvantage cannot be neglected from a practical point of view is the large amount of foaming which takes place in the course of dissolving the soaps in water with agitation.

SUMMARY OF THE INVENTION

Present inventors have found a method for acidifying soaps overcoming all the above described disadvantages and having the advantage of limiting the quantity of water to that required for solubilization of the mineral salts liberated by the acidification.

The new method of this invention comprises dissolving the soaps in at least one fatty acid in a melted state in the absence of oxygen, contacting the liquid solution of soap in fatty acid with an aqueous solution containing an amount of strong mineral acid at least stoichiometrically equivalent to the soap and allowing the cations of soap and strong acid to exchange phases, the amount of water being sufficient to dissolve substantially all of the mineral salt thus formed. By limiting the amount of water in this way the impractical dilutions of the prior art are avoided; the best advantage being obtained by so limiting the water to an amount just sufficient to dissolve the mineral salt.

The method of this invention can be carried out in successive batches or as a continuous process. It is particularly suitable for continuous countercurrent operation.

The fatty acid or acids used to dissolve the soaps in the method of this invention can be identical to or different from the fatty acids corresponding to the starting soap or soaps.

DETAILED DESCRIPTION

The method according to this invention can be applied to any soap, preferably to soaps having the formula $(RCOO)_nM$ either singly or in mixtures, wherein R is a $C_4$ to $C_{30}$ straight chain or branched alkyl and M is an alkali or alkaline-earth metal, exemplarily sodium, potassium, calcium, barium, strontium, or ammonium, and wherein $n$ corresponds to the valence of M, being 1 for sodium, potassium, and ammonium soaps and 2 for soaps of calcium, barium, strontium and the like. In particular such soaps can be those prepared by caustic oxidation of oxygenated products such as alcohols, aldehydes, esters and the like. The nature of M then corresponds to the identity of the caustic used in such oxidation.

Thus, the method of this invention can be applied to soaps exemplarily derived from valeric acid, caproic acid, enanthic acid, caprylic acid, pelargonic acid, capric acid, n-undecylic acid, lauric acid, n-tridecylic acid, myristic acid, n-pentadecylic acid, palmitic acid, margaric acid, stearic acid, n-nonadecylic acid, arachidic acid, n-heneicosoic acid, behenic acid, n-tricosoic acid, lignoceric acid, n-pentacosoic acid, cerotic acid, n-heptacosoic acid, montanic acid, n-nonacosoic acid, melissic acid, n-hentriacontoic acid and the like, including their branched isomers. Fatty acids which can be used in carrying out the method can be selected singly or in combination from any of the above named acids.

The soap, preferably in the melted state, is introduced in the absence of air into a reactor or mixing tank. Simultaneously there is introduced into the same reactor, also in the melted state, a fatty acid whose radical has at least 4 carbon atoms and is preferably the same as that of the soap. When the soap to be converted comprises a mixture of soaps having different chain lengths or molecular weights, it is preferred to use as the solvent a corresponding fatty acid mixture such as can be prepared by the conversion of such a soap mixture by the method of this invention.

Solubilization of the liquid soap in the liquid acid can be carried out in any manner such as to achieve substantially complete inter-dispersion and homogenization of the two components. The preferred procedure is to use a mechanical mixer. The solubilization is carried out in the substantial absence of oxygen such as, for example, under an inert atmosphere of nitrogen or other inert gas, at a temperature between 50° and 150° C., preferably between 80° and 110° C. Subatmospheric pressure or vacuum can be used but in general it is preferred to carry out the dissolution at substantially atmospheric pressure. The weight ratio of soap to acid used must be such that the mixture is liquid at the temperature of solubilization, i.e. from about 2/1 to 0.2/1 and preferably from about 1/1 to 0.3/1.

After homogenization, this mixture is transferred to a second reactor wherein the conversion of the soap to acid is carried out by simultaneous addition of an aqueous solution of a strong mineral acid such as sulfuric acid, hydrochloric acid, phosphoric acid or the like. The mineral cid is preferably used in about 5 to 10% excess over the stoichiometric quantity theoretically required for complete conversion of the soap to its corresponding acid while the water is used in amount such as to be sufficient to dissolve substantially all of the mineral salts formed in the acidification. This reaction also is preferably carried out in the absence of oxygen, exemplarily under inert gas such as nitrogen and at substantially atmospheric pressure and at a temperature equal or less than the boiling temperature of the aqueous salt solution.

Using known procedures, the organic layer is decanted, part being recycled for the solubilization of soap and part being purified by washing.

When the acid used as solvent has a radical different from that of the soap, the layer of organic acids, after decantation and washing, can be separated into its respective acid components, exemplarily by distillation. The solvent organic acid is then recycled for the solubilization of soap.

This invention will be further illustrated by description in connection with the following specific examples of the practice of it wherein, as also elsewhere herein, proportions are in parts by weight unless stated otherwise.

EXAMPLE 1

In this example the raw soap coverted to fatty acids by the method of this invention is a mixture of sodium carboxylates having chain lengths of 12, 13, 14 and 15 carbons. These soaps have originated from a mixture of alcohols made by OXO synthesis and having corresponding chain lengths of 12, 13, 14 and 15 carbons. These alcohols have been supplied continuously at a rate of one kilogram per hour to an alkaline fusion reactor in which the alcohols have been oxidized in the presence of sufficient sodium hydroxide to convert the alcohols by conventional techniques to said corresponding carboxylate soaps.

The alkali-fusion reactor delivers a 1.16 Kg/hr stream (1) of these raw liquid soaps at about 300° C., which is sent to a mixer maintained under nitrogen in the absence of air and at a temperature of 90° C. Simultaneously this mixer is supplied with a stream (2) of 2.15 Kg/hr of a mixture of corresponding acids having the same molecular weights i.e. the fatty acids of stream (2) are composed of carboxylic acids having 12, 13, 14 and 15 carbons in substantially the same proportions as the soaps of stream (1). The two streams are thoroughly homogenized under agitation. The mixture thus obtained is delivered to a second mixer, likewise maintained in the absence of air and at 90° C., where it is acidified by a 1.16 liters/hr stream of an aqueous solution of 160 grams HCl per liter, converting the soaps in the organic phase to fatty acids and releasing sodium ions to the aqueous phase to form an aqueous solution of sodium chloride. When the agitation is stopped, two distinct layers of aqueous and organic phases respectively are formed. Substantially no foaming is observed.

The organic phase is separated from the aqueous saline solution by decantation at 90° C.

One Kg/hr of the acids prepared in this manner is submitted to purification while 2.15 Kg/hr is recycled for solubilization to soap.

EXAMPLE 2

An OXO mixture of $C_{16}$ to $C_{19}$ alcohols is subjected to caustic oxidation by potassium hydroxide, and a one-kilogram per hour stream of the corresponding fatty acid soap mixture is delivered at 320° C. to a solubilization reactor fitted with mechanical agitation. There is simultaneously charged 2 Kg/hr of corresponding acids having the same molecular distribution as the soaps. The system is kept free of air by maintaining under an atmosphere of nitrogen. Temperature is maintained at about 100° C.

The resulting mixture is delivered to the acidification reactor, likewise free of air and at about 100° C., and treated with a 3.8 liters/hr stream of an aqueous solution containing 42 grams/liter of sulfuric acid.

The organic acid layer is separated at 100° C. from the aqueous saline solution by decantation. No difficulty with foaming is encountered. A 875 grams/hr portion of the acid obtained is submitted to purification while 2 Kg/hr is recycled to the mixer to solubilize more soap.

EXAMPLE 3

An OXO mixture of $C_{16}$ to $C_{19}$ alcohols is subjected to caustic oxidation by sodium hydroxide delivering at 320° C. the corresponding fatty acid soaps. One Kg/hr of these crude soaps is charged to the solubilization reactor maintained under an atmosphere of nitrogen at about 100° C. and is mixed there, under agitation, with 1.7 Kg/hr of acids having the same molecular distribution corresponding to the soaps, then transported to the acidification reactor maintained likewise under nitrogen, at about 100° C. The soap formed is acidified by 2.25 liters/hr stream of an aqueous solution containing 72 grams/liter of sulfuric acid. The fatty acid phase is separated from the aqueous saline phase by decantation at 100° C. No difficulty with foaming is encountered.

A 910 gram/hr portion of the acids obtained is submitted to purification, while 1.7 Kg/hr is recycled to the first mixer as a solvent for crude soaps.

EXAMPLE 4

Sodium isooctanoate is obtained by caustic oxidation of isooctyl alcohols by sodium hydroxide at 320° C. One Kg/hr of this crude soap is delivered to the solubilization reactor maintained under atmosphere of nitrogen at 80° C., where it is mixed under agitation with 1.2 Kg/hr of isooctanoic acid. The mixture is then delivered to the acidification reactor maintained likewise in absence of air and at 80° C.

The soap is acidified by a continuous charge of an aqueous solution containing 120 grams/liter of sulfuric acid delivered at 2.7 liters/hour. The released organic acid layer is separated from the aqueous saline layer by decantation at 80° C. No difficulty with foaming is encountered.

A 865 grams/hr stream of the isooctanoic acid obtained is sent to be purified by washing, while 1.2 Kg/hr are recycled to the first mixer to effect solubilization of crude isooctanoate soap.

EXAMPLE 5

Example 4 is repeated except that in place of the isooctanoic acid there is used a 1.2 Kg/hr stream of isodecanoic acid. The acidified product contains about 865 grams/hr of isooctanoic acid in intimate admixture with about 1.2 Kg/hr of isodecanoic acid. After washing the mixture, the two acids are separated by fractional distillation, the isooctanoic acid is exploited as a product and the isodecanoic acid is recycled to effect solubilization of crude isooctanoate soap.

EXAMPLES 6a – 6g

A series of examples is carried out in which the procedure of example 4 is followed except that in place of isooctanoate soap and its corresponding isooctanoic acid, there is used a different pair of soap and corresponding acid, these pairs being respectively as follows:

| EXAMPLE | CRUDE SOAP | FATTY ACID |
| --- | --- | --- |
| 6a | Sodium pentanoate | valeric acid |
| 6b | potassium heptanoate | enanthic acid |
| 6c | calcium decanoate | capric acid |
| 6d | sodium behenate | docasanoic acid |
| 6e | sodium cerotate | hexacosanoic acid |
| 6f | sodium triacontanoate | melissic acid |
| 6g | sodium hentriacontoates | hentriacontoic acids |

In each of these examples, the crude soap is delivered at about 300° C. and the contacting with aqueous alkali and subsequent phase separation is carried out at about 95° C. In each case a substantially complete conversion of the soap to its corresponding acid is obtained.

We claim:

1. A method for preparing fatty acids from corresponding soaps which method comprises
    i. dissolving a soap in a melted state having the formula $(RCOO)_nM$, singly or in mixtures, wherein R is a $C_4$ to $C_{30}$ straight-chain or branched alkyl, M is an alkali or alkaline earth metal, and n corresponds to the valence of M in at least one $C_5$ to $C_{31}$ fatty acid in a melted state in the absence of oxygen and at a temperature of between 50° to 150° C. to form a liquid solution of soap in fatty acid, the weight ratio of soap to fatty acid being from about 2/1 to 0.2/1.
    ii. contacting said solution with an aqueous solution containing an amount of strong mineral acid at least stoichiometrically equivalent to the soap and
    iii. allowing the cations of soap and strong acid to exchange phases, the amount of water being sufficient to dissolve substantially all of the mineral salt thus formed.

2. The method of claim 1 wherein the ion-exchange of steps (ii) and (iii) is carried out at a temperature equal or less than the boiling temperature of the aqueous salt solution.

3. The method of claim 1 wherein the fatty acid or acids used to dissolve the soaps in step (i) have the same composition as the fatty acids corresponding to the soaps.

4. The method of claim 1 wherein the soap is produced by hydroformylating olefins according to the OXO process followed by alkaline fusion of the resultant oxygenated products.

5. The method of claim 1 wherein the operations are carried out at substantially atmospheric pressure.

6. The method of claim 2 wherein the dissolving is carried out at 80°–110° C.

7. The method of claim 1 wherein the weight ratio of soap to fatty acid is from about 1/1 to 0.3/1.

* * * * *

UNITED STATES PATENT AND TRADEMARK OFFICE
CERTIFICATE OF CORRECTION

PATENT NO. : 4,018,805
DATED : April 19, 1977
INVENTOR(S) : Auguste Gueant and Serge Mercier It is certified that error appears in the above–identified patent and that said Letters Patent are hereby corrected as shown below:

Column 2, line 63, "mineral cid" should read --mineral acid--

Column 3, line 22, "coverted" should read --converted--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks